United States Patent [19]
Gregory

[11] 3,882,381
[45] May 6, 1975

[54] SYSTEM FOR DETECTING WET AND ICY SURFACE CONDITIONS

[75] Inventor: Robert O. Gregory, St. Louis, Mo.

[73] Assignee: Surface Systems, Inc., Warson Woods, Mo.

[22] Filed: Nov. 5, 1973

[21] Appl. No.: 412,910

[52] U.S. Cl................. 324/61 R; 317/246; 340/234
[51] Int. Cl.............................................. G01r 27/26
[58] Field of Search........... 324/61 R; 340/234, 235; 317/246

[56] References Cited
UNITED STATES PATENTS

| | | | |
|---|---|---|---|
| 3,155,901 | 11/1964 | Hanken | 324/61 R |
| 3,255,412 | 6/1966 | Liu | 324/61 R |
| 3,278,843 | 10/1966 | Deming | 324/61 R |
| 3,320,946 | 5/1967 | Dethloff et al. | 324/61 R X |
| 3,504,280 | 3/1970 | Byrd | 324/61 R |
| 3,688,190 | 8/1972 | Blum | 324/61 R |
| 3,753,373 | 8/1973 | Brown | 324/61 R X |

*Primary Examiner*—Stanley T. Krawczewicz
*Attorney, Agent, or Firm*—Koenig, Senniger, Powers and Leavitt

[57] ABSTRACT

A system for detecting wet and icy conditions on the surface of highways, airport runways and the like. A first capacitor is positioned on a surface the condition of which is being detected. This capacitor has first and second spaced-apart electrodes which are positioned substantially coplanar with the surface and exposed to atmospheric precipitation which affects the capacitor's dielectric and capacitance. A second capacitor having first and second spaced-apart electrodes is positioned so as not to be exposed to atmospheric precipitation. Respective out-of-phase time-varying signals are applied to the first electrodes of said capacitors and the second electrodes are commonly connected. Means for indicating when the magnitude of a signal coupled to the commonly connected second electrodes reaches a predetermined magnitude provides an indication of the presence of any atmospheric precipitation on said surface.

18 Claims, 5 Drawing Figures

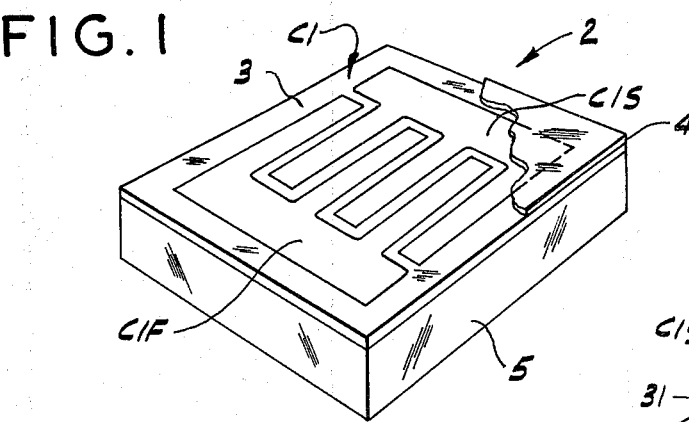
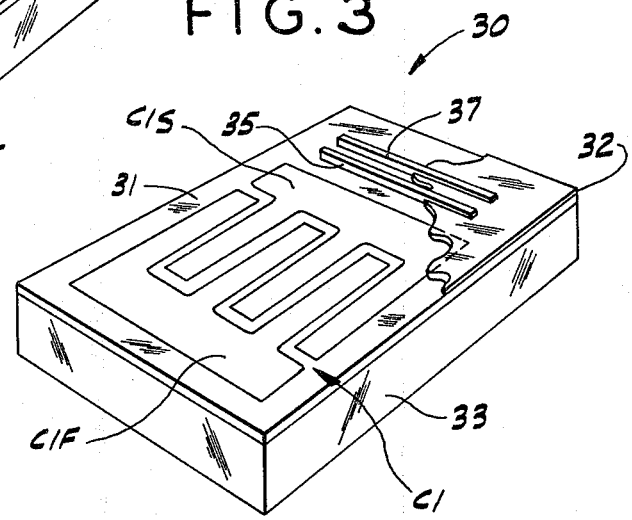
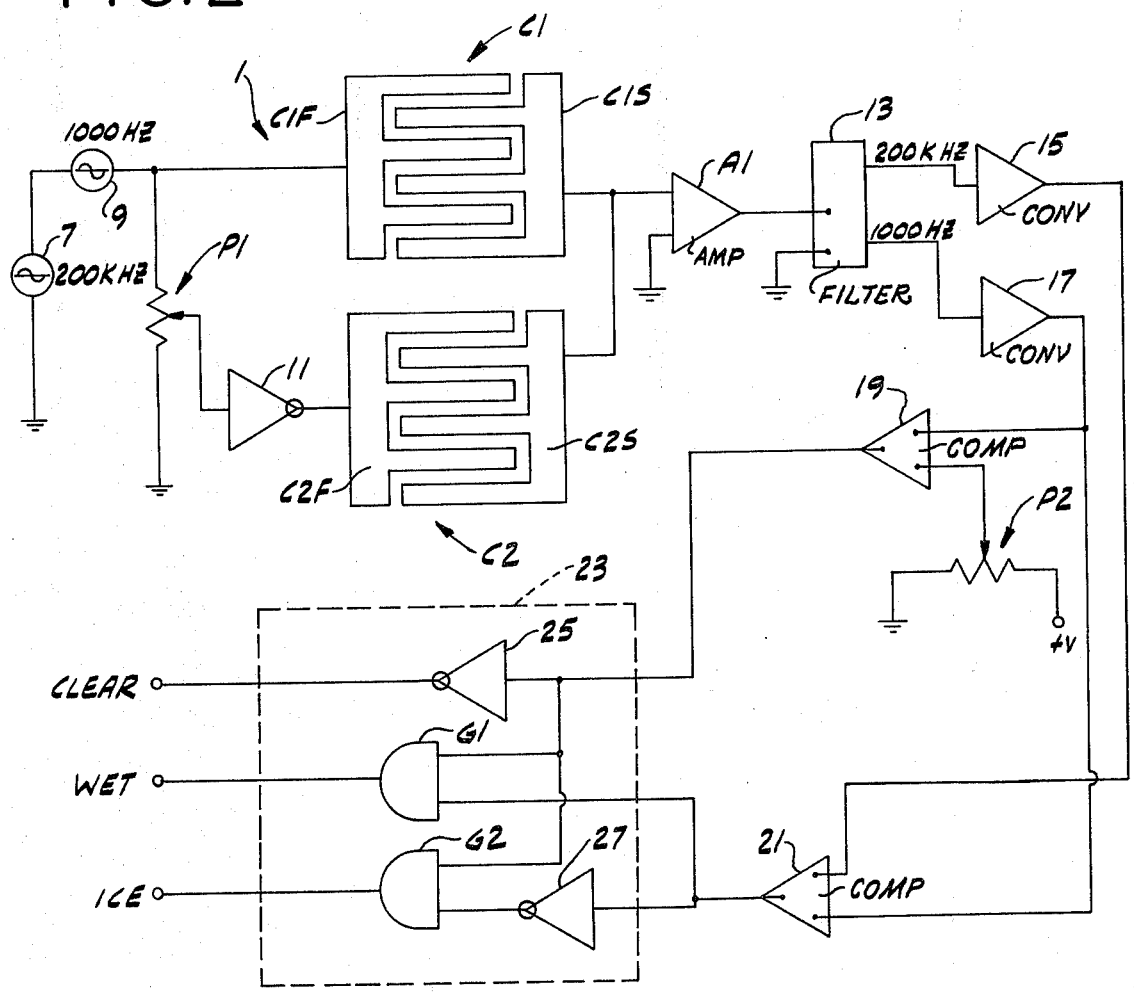

SYSTEM FOR DETECTING WET AND ICY SURFACE CONDITIONS

BACKGROUND OF THE INVENTION

This invention relates to detection systems and more particularly to systems for detecting wet and icy conditions on the surface of highways, airport runways and the like.

The desirability of having a reliable system for determining and indicating hazardous surface conditions due to atmospheric precipitation is self-evident. Such a system is useful to warn drivers of wet, icy and incipiently icy conditions on highways and bridges, to alert maintenance crews of the need for application of de-icing chemicals, and in the detection of icing on aircraft surfaces to indicate to the pilot that precautionary measures should be taken.

A number of systems have been proposed for detecting wet and icy conditions on a surface but each has one or more serious shortcomings. Such systems can be categorized as indirect or direct. Indirect systems do not monitor the actual surface condition but instead attempt to predict the surface conditions by measuring air temperature and humidity. Needless to say, they are not reliable because ambient temperature and humidity are not consistently accurate indicators of the presence or absence of ice on an exposed surface. Some of the direct measurement systems, such as those requiring microwave or beta radiation, are quite expensive and are not wholly reliable.

Most of the simple and less expensive direct systems usually depend on the different conductivities of ice and water by using two pairs of exposed adjacent electrodes with one pair being heated. This type of direct systems often includes a temperature sensor and in one instance includes a sensor-capacitor to ascertain the amount of precipitation connected as one leg of a bridge circuit as shown in U.S. Pat. No. 3,428,890. Another direct system uses a heated stainless steel strip with a thermocouple which is cyclically heated and cooled and senses the presence of ice due to heat needed in the change of state from ice to water.

A serious drawback of these prior art direct systems is that a heated sensor may melt the ice in its immediate vicinity and the resulting water will evaporate or be blown or spashed off the heated sensor by passing vehicles. With the water removed from the heated sensor both sensors measure low conductivity thereby erroneously indicating the surface to be clear.

A weather detector system using a series of exposed parallel vertical plates as a capacitance sensor was developed by the Navy to determine both the rate of precipitation as well as the type. The dielectric constant in the gaps between the plates would be affected by rain falling downwardly therebetween the plates or by ice being formed or snowfall, but this was unsatisfactory and impractical. Capacitance sensors have also been used in the insulation industry for measuring the moisture content of a sample of insulation such as paper. One such system, shown in U.S. Pat. No. 3,684,953, uses a probe having upstanding, flat facing electrodes with the sample to be tested placed to bridge the top edges of the electrodes but this, too, would be impractical for detecting wet and icy conditions on the surface of a highway or runway, etc.

SUMMARY OF THE INVENTION

Among the several objects of this invention may be noted the provision of an improved system for detecting various surface conditions; the provision of such a system which will not affect the state or nature of the precipitation being detected by melting and/or evaporation; the provision of a surface condition detection system which indicates clear, wet, or icy surface conditions; the provision of such a system in which the sensor is rugged and compact and easily mountable on the surface of a highway, runway or the like; the provision of such a system which employs high reliability solid-state electronics and is simple and economical to manufacture. Other objects and features will be in part apparent and in part pointed out hereinafter.

Briefly, a system for detecting wet and icy surface conditions includes a first capacitor positioned on a surface the condition of which is to be detected. The capacitor has first and second spaced-apart electrodes which are positioned substantially coplanar with the surface and exposed to atmospheric precipitation which affects the capacitor's dielectric and capacitance. A second capacitor having first and second spaced-apart electrodes is positioned so as not to be exposed to atmospheric precipitation. Respective out-of-phase time-varying signals are applied to the first electrodes of the capacitors, and the second electrodes are commonly connected. Means for indicating when the magnitude of a signal coupled to the commonly connected second electrodes reaches a predetermined magnitude provides an indication of the presence of any atmospheric precipitation on said surface.

BRIEF DESCRIPTION OF THE DRAWINGS

FIG. 1 is a perspective of a sensor utilized in a system of the present invention;

FIG. 2 is a schematic diagram of a system of the present invention;

FIG. 3 is a perspective of another sensor conponent;

Corresponding reference characters indicate corresponding parts throughout the several views of the drawings.

DESCRIPTION OF PREFERRED EMBODIMENTS

Figure 4:
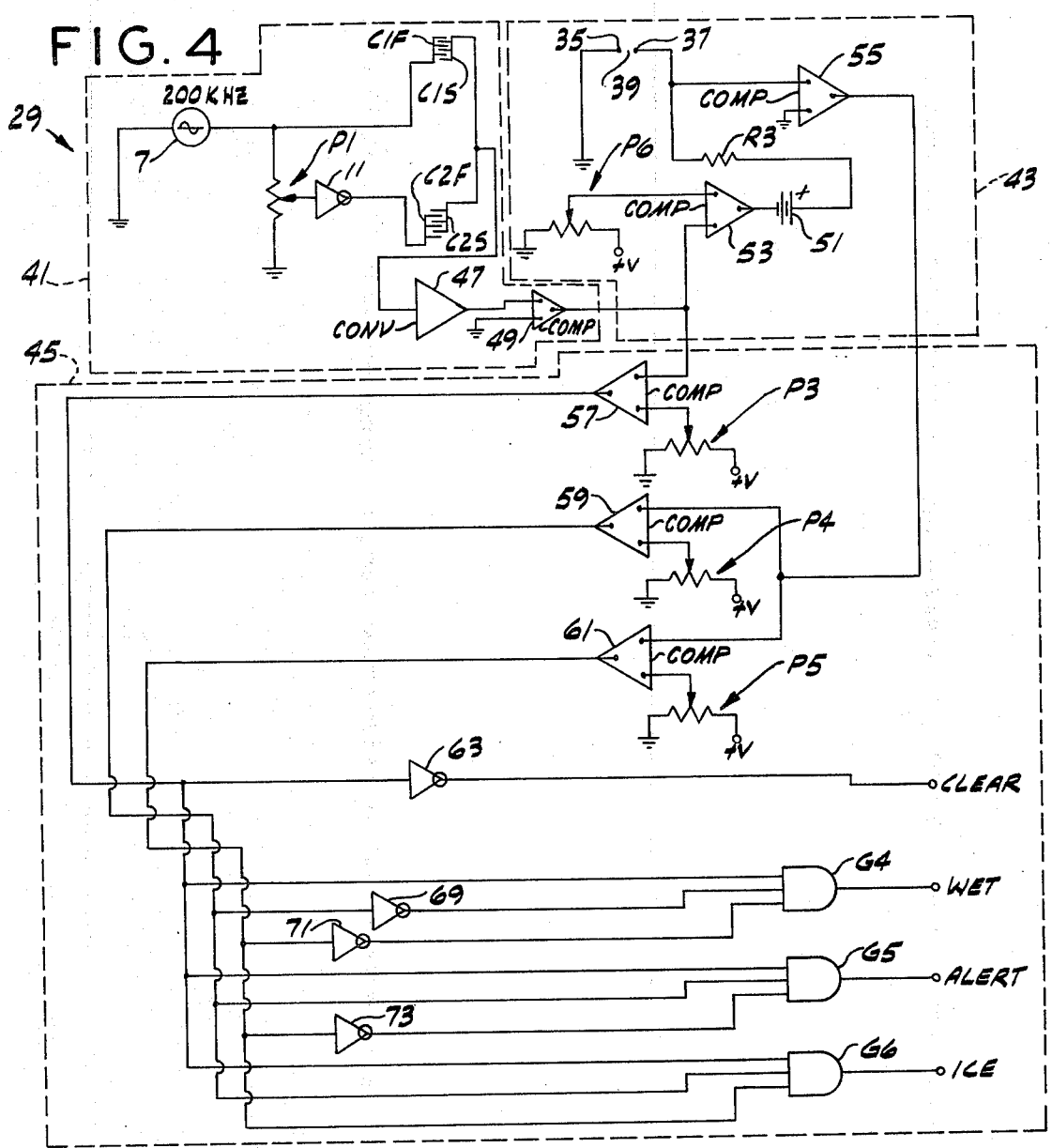
FIG. 4 is a schematic diagram of a surface condition detection system utilizing the sensor of FIg. 3.

Referring now to the drawings, a system for detecting wet and icy conditions on the surface of highways, airport runways and the like is indicated in its entirety at 1. A sensor 2 for this system is shown in FIG. 1 as comprising a printed circuit board 3 encapsulated in a block of synthetic resin material, such as an epoxy or the like. This is embedded in a highway or runway, etc., so that the top of the block is substantially flush with the surface thereof.

The insulative substrate of board 3 has a first pair of spaced-apart, interdigitated, substantially coplanar copper electrodes C1F,C1S etched on its top surface and forming the electrodes of a capacitor C1. On its opposite surface the board has a pair of identical copper electrodes C2F,C2S (not shown in FIG. 1) in registry with respective electrodes C1F and C1S and forming the plates of a second capacitor C2. The upper or top surface of board 3 is covered by a thin layer 4 of epoxy resin, e.g., one-sixteenth inch or so, so that electrodes C1F,C1S have only a thin layer of epoxy covering them while the undersurface of the board carrying electrodes C2S,C2F has a much thicker layer 5, (e.g., one inch) covering it.

This sensor unit is embedded in the surface of the roadway, highway, etc., and interconnected by a cable lead or by radio link to a remote monitoring station. The use of interdigitated electrodes permits the sensor to be compact in size thus simplifying its installation in the surface of a highway or the like.

With sensor 2 embedded in the surface so that the electrodes of capacitor C1 are substantially flush with the susrface, capacitor C1 is exposed to atmospheric precipitation in that precipitation on the surface forms part of its dielectric and accordingly affects its capacitance. Capacitor C2 is not so exposed and precipitation does not affect its dielectric or capacitance.

As shown in FIG. 2, identical but 180° out-of-phase signals which are composites of a lower frequency substantially constant amplitude signal and a higher frequency substantially constant amplitude signal are applied to the first electrodes C1F,C2F of the capacitors. For this purpose a signal generator 7 having, for example, a 200 Khz frequency output and a low frequency (e.g., 1000 Hz) signal generator 9 are series connected from ground to electrode C1F. Conventional signal generators, preferably having the usual gain control to vary the amplitude of the output signals, may be used for this purpose. Typically, the signal generators are adjusted so that the amplitudes of the lower and the higher frequency signal components are equal. The composite signal applied to electrode C1F is inverted by an inverter 11 and a potentiometer P1 is provided to adjust the relative amplitudes of the 180° out-of-phase composite signals applied to capacitor electrodes C1F and C2F. The second electrodes C1S,C2S of the capacitors are commonly connected.

Second electrodes C1S,C2S are connected to the input terminal of a conventional operational amplifier A1, the output of which is filtered by a filter 13 to separate the 200 Khz and 1000 Hz components of the coupled, amplified composite signal. In the absence of any precipitation on the top of the exposed surface of sensor 2, the composite signal coupled through the electrodes C1F, C1S of capacitor C1 to the input of amplifier A1 will be substantially equal to the amplitude of the 180° out-of-phase composite signal coupled thereto via electrodes C2F,C2S of capacitor C2 inasmuch as the capacitors' dielectric is constituted by the two layers 4 and 5 of the same epoxy resin material. As the thickness of the latter layer is considerably greater than that of the former, potentiometer P1 is adjusted to compensate for the effect of this minor difference in the capacitances of C1,C2 under clear surface conditions and insure that the resultant signal at the input of amplifier A1 is zero. Thus, potentiometer P1 provides a means for balancing the amplitudes of the respective out-of-phase composite signals coupled to the commonly connected second electrodes so that these signals will effectively cancel each other when the exposed sensor surface is free of precipitation.

When the top surface of sensor 2 is covered with water, the dielectric constant and thus the capacitance of capacitor C1 increases while that of capacitor C2 remains unaffected. The resulting difference in capacitances causes a resultant composite signal to be present at commonly connected second electrodes C1S, C2S. Since the dielectric constant of water does not vary significantly with frequency (the generally accepted dielectric constant of water is about 78 at a temperature of 25°C. at all frequencies from d.c. to microwave), the amplitudes of the coupled higher and lower frequency components will be equal. The capacitance of C1 will also be affected by the formation or deposit of frost, ice, sleet or snow on the exposed surface of sensor 2. While the dielectric constant of water and ice are the same at low frequencies, the dielectric constant of ice decreases as the frequency is increased while that of water remains the same within limits. Ice, as well as water, is made up of polar molecules and ice has a high dielectric constant at low frequencies. However, as the electric frequency is increased, the onset of dielectric relaxation and consequent decrease in dielectric constant occurs at a very much lower frequency in ice than in water. The frequency range over which the dielectric constant of ice shows a marked decrease is somewhat dependent on temperature; but for temperatures on the order of 0° to 10° F. a typical value is 2 Khz to 50 Khz, i.e., the dielectric constant will decrease as the frequency increases from 2 Khz to 50 Khz. The polar nature of the water molecule is utilized herein. This, if the surface is covered with ice, a resultant composite signal will be present at the second electrodes, but because of the phenomenon described above the lower frequency coupled component will be stronger than the higher frequency coupled component because the dielectric constant of ice decrease markedly with frequency.

In summary then, if the surface is clear, no appreciable signal will be present at the commonly connected second electrodes. If the surface is wet, the 1000 Hz and 200 Khz coupled components are approximately equal. But if the surface is icy, the amplitude of the 1000 Hz coupled component substantially will exceed that of the 200 Khz coupled component.

Alternating current to direct current converters 15,17 convert the respective 200 Khz and 1000 Hz signals to analogous d.c. voltages. The output of converter 17 is commonly connected to one input of a comparator 19 and one input of a comparator 21. Comparator 19 has a second input to which is applied a d.c. voltage level adjustable by a potentiometer P2 connected from +V to ground. Comparator 19 serves to establish a precipitation threshold. That is, if the output of converter 17 is greater than an empirically determined threshold voltage, i.e., as adjusted by potentiometer P2, comparator 19 provides a logic "1" indicating some form of precipitation is present on the top surface of sensor 2. On the other hand, if the output of converter 17 is below the d.c. level established by potentiometer P2, comparator 19 has a "0" output indicating the surface is clear. It should be noted the 1000 Hz coupled component is used as an input to comparator 19 because it will have a high amplitude regardless of whether water or ice is present on the sensor top surface. Also, inasmuch as any minor differences in the capacitances of capacitors C1 and C2 under dry conditions may be compensated by adjustment of potentiometer P2, potentiometer P1 is optional.

The output of converter 15 is connected to the other input of comparator 21. If both inputs to comparator 21 are of equal magnitude, it will provide a logic 1 output indicating the surface is wet. If the output of converter 17 is greater than the output of converter 15, comparator 21 has a logic 0 output indicating the surface is icy. Thus comparator 21 is responsive to a change in the ratio of the magnitudes of the coupled higher frequency signal component and lower frequency component to indicate icy conditions. Comparator 21 serves to determine whether the surface is wet or icy once comparator 19 has determined some form of precipitation is on the surface.

A logic circuit 23 processes the outputs of the comparators and provides signals indicative of clear, wet, or icy surface conditions. The output of comparator 19 is commonly connected to an inverter 25, to one input of an AND gate G1, and to one input of an AND gate G2. The output of comparator 21 is commonly connected to the other input of gate G1 and to the other input of gate G2 through an inverter 27.

Operation of the system of FIG. 2 is as follows: If the surface is dry, either no signal, or a very small signal, will be present at the commonly connected second electrodes thereby causing the magnitude of the output of converter 17 to be less than the d.c. level applied to comparator 19 by potentiometer P2. This in turn causes comparator 19 to provide a 0 logic signal which is inverted by inverter 25 which provides a 1 output indicating "clear" surface conditions. If water is present on the surface, a composite signal having substantially equal amplitude lower and higher frequency components will be applied to the input of amplifier A1. The respective outputs of converters 15 and 17 will be of substantially equal magnitude, that magnitude being greater than the d.c. level applied to comparator 19 by potentiometer P2. Each of the comparators 19 and 21 will then have a 1 logic output thereby causing gate G1 to provide a 1 output which signals that the surface is wet. Finally, if the surface is ice covered, a resultant composite signal with a lower frequency component of substantially greater amplitude than that of the higher frequency component will be coupled to sensor second electrodes C1S and C2S and the input of amplifier A1. The output of converter 17 will be of greater amplitude that either the output of converter 15 or the d.c. level applied to comparator 19 by potentiometer P2. This causes comparator 19 to provide a 1 output and comparator 21 to have a 0 output which is inverted by inverter 27. With these inputs gate G2 will yield a 1 output thereby indicating an icy surface condition. The outputs of inverter 25 and gates G1 and G2 are employed to provide visual and/or audible indication of the various surface conditions. This system is able, then, to detect surface conditions without destroying the precipitation being detected through melting and/or evaporation as is the case in systems using a conductivity sensor having heated electrodes.

Referring now to FIGS. 3 and 4, another surface condition detection system is generally indicated at 29. A dual sensor 30 including printed circuit board 31, similar to board 3 of the previous embodiment, is shown in FIG. 3 with a thin layer 32 covering the top of the p.c. board and a thick layer 33 covering the bottom thereof. As in the previous embodiment, board 31 carries electrodes C1F, C1S of capacitor C1 on its top surface and registering electrodes C2F,C2S of capacitor C2 on its bottom surface. A pair of parallel spacedapart strips of stainless steel 35,37 which have their upper edges exposed through the top of epoxy layer 32 are mounted to the p.c. board adjacent the electrodes of capacitor C1. Strips 35,37 constitute the electrodes of an unheated conductivity sensor 39. Sensor 30 is embedded in the surface as previously described. It should be noted that even with the parallel strips added, sensor 30 is still of compact size and easily mounted in the surface of a highway, bridge deck, runway or the like.

The detection system of FIG. 4 includes a capacitance circuit 41, a sensor circuit 43 and a logic circuit 45. Capacitance circuit 41 functions to detect any atmospheric precipitation (either in the form of water or ice) present on the surface the condition of which is being detected. Sensor circuit 43 determines whether the precipitation is in the form of water or ice. Logic circuit 45 is responsive to signals from both the capacitance and sensor circuits to indicate the state of the surface, viz., clear, wet, icy or alert. The significance of the alert indication will be explained hereinafter.

Capacitance circuit 41 is similar to the circuit described in the previous embodiment except only the 200 Khz signal generator 7 is used. The junction between second electrodes C1S,C2S is connected to the input of an alternating current to direct current converter 47 the output of which is amplified by an amplifier 49. Signal generator 7 and inverter 11 apply identical 180° out-of-phase constant amplitude signals to first electrodes C1F,C2F respectively.

Potentiometer P1 is, as in the previous embodiment, optionally used to adjust the amplitude of the signal applied to electrodes C2F so that in the absence of any precipitation no substantial resultant signal is coupled to the commonly connected second electrodes. The presence of any precipitation on the exposed surface of sensor 30 increases the capacitance of C1 thereby causing a signal to be present at the second electrodes and a resulting d.c. voltate to be supplied at the output of converter 49. In this manner capacitance circuit 41 senses the presence of any form of precipitation present on the surface.

Sensor circuit 43 determines, once capacitance circuit 41 has detected the presence of precipitation on the surface, whether that precipitation is in the form of ice or water. Sensor circuit 43 includes conductivity sensor 39 which has first and second spaced-apart electrodes, 35,37 exposed to precipitation on the surface. Conductivity sensor 39 is series-connected with a resistor R3 across a battery 51. When a comparator 53, the purpose of which will be explained below, has a 0 logic level output, the negative terminal of battery 51 is grounded thereby completing the series circuit through sensor 39. The nature or state of the precipitation on conductivity sensor 39 determines the potential or voltage of the junction between sensor 39 and resistor R3 relative to ground. This voltage, amplified by an amplifier 55, constitutes the output of sensor circuit 43. Since the conductivity of water is much greater than that of ice, sensor circuit 43 will provide a much lower amplitude output signal with water present on the surface than with ice present.

Logic circuit 45 is responsive to the outputs of both capacitance circuit 41 and sensor circuit 43 to provide indication of various suruface conditions. The top input of a comparator 57 is connected to the output of amplifier 49 while its bottom input is connected to the slider of a potentiometer P3 which applies an adjustable d.c. voltage thereto. With any type of atmospheric precipitation present on the surface, the magnitude of the output d.c. signal level of amplifier 49 exceeds that of the voltage applied by potentiometer P3 causing comparator 57 to have a 1 logic level output. On the other hand if the surface is free of precipitation, the output d.c. signal level of amplifier 49 will fail to reach the predetermined precipitation threshold magnitude as established by potentiometer P3 thereby causing comparator 57 to provide a 0 output.

With uncontaminated water present on the surface of sensor 30, amplifier 49 will have an exemplary output of 1 volt, while with uncontaminated frost the output of amplifier 49 will drop to a typical level of 0.4 to 0.5 volts. With potentiometer P3 adjusted to apply a predetermined precipitation threshold voltage of a magnitude slightly less than 0.4 volts to the bottom input of comparator 57, the comparator will provide a 1 output if either water or ice is present on the surface of sensor 30.

The output of amplifier 55 is commonly connected to respective top inputs of comparators 59,61. Their bottom inputs are respectively connected to the sliders of potentiometers P4,P5. Amplifier 55 will have an exemplary output of about 2.5 volts with ice present on the sensor's surface. With potentiometer P5 adjusted to supply slightly less than 2.4 volts, a magnitude analogous to the resistance of the conductivity sensor with a mixture of ice and water on the surface, to comparator 61, this comparator will provide a 1 output when ice is present on the surface. Potentiometer P4 is set so as to apply a slightly lower voltage to comparator 59 than potentiometer P5 applies to comparator 61. When water on the surface begins to freeze, the output voltage level of amplifier 55 exceeds the d.c. voltage level supplied by potentiometer P4 thereby causing comparator 59 to have a 1 output. The voltage levels established by potentiometers P4,P5 at the inputs of comparators 59, 61 respectively represent a predetermined alert threshold magnitude and a predetermined ice threshold magnitude.

The output of comparator 57 is commonly directly connected to an inverter 63 and to one input to each of three AND gates G4, G5 and G6. The output of comparator 59 is directly connected to one of the inputs of each of AND gates G5 and G6, and via an inverter 69 is connected to one of the inputs of gate G4. The output of comparator 61 is directly connected to the third input of gate G6 and, through inverters 71 and 73 respectively, to the third inputs of gates G4 and G5.

Operation of the system of FIG. 4 is as follows: If the surface of sensor 30 is dry either no signal, or a very small signal, will be present at the commonly connected second electrodes and the magnitude of the d.c. output of amplifier 49 is less than the d.c. level applied to comparator 57 by potentiometer P3 thereby causing comparator 57 to yield a 0 output which is inverted by inverter 63 to indicate a clear surface condition. If precipitation in any form is present on the sensor surface a resultant net signal will be present on electrodes C1S,C2S causing the d.c. output voltage of amplifier 49 to be greater than the d.c. level applied to comparator 57 by potentiometer P3 and comparator 57 will have a 1 output. If that precipitation is in the form of water, the resistance of conductivity sensor 39 will be low causing the d.c. output voltage of amplifier 55 to be lower than the d.c. levels applied to comparators 59,61 by potentiometers P4,P5, respectively, which causes comparators 59,61 to provide 0 outputs. With comparators 57,59,61 having 1, 0, 0 outputs respectively, gate G4 will provide a 1 output indicating the surface is wet. If ice is on the surface, the resistance of conductivity sensor 39 will be high causing the d.c. output level of amplifier 55 to be greater than the d.c. levels applied to comparators 59,61 by potentiometers P4,P5 respectively. This causes both comparators 59 and 61 to provide 1 outputs. With comparators 57,59,61 each having a 1 output, gate G6 will in turn have a 1 output warning that the surface is icy. Finally, if water on the surface is starting to turn into ice, the resistance of conductivity sensor 39 will be somewhat less than if only ice were present thereby causing the d.c. output level of amplifier 55 to be greater than the d.c. level applied to comparator 59 by potentiometer P4 but less than the d.c. level applied to comparator 61 by potentiometer P5. Thus comparator 59 will then provide a 1 output and comparator 61 will have a 0 output. When comparators 57,59,61 provide 1, 1, 0 outputs respectively, gate G5 will have a 1 output thereby effecting an alert signal indicating that ice is beginning to form. Thus the outputs of inverters 63 and gates G4, G5,G6 are employed to provide visual and/or audible indication of the various surface conditions.

Figure 5:
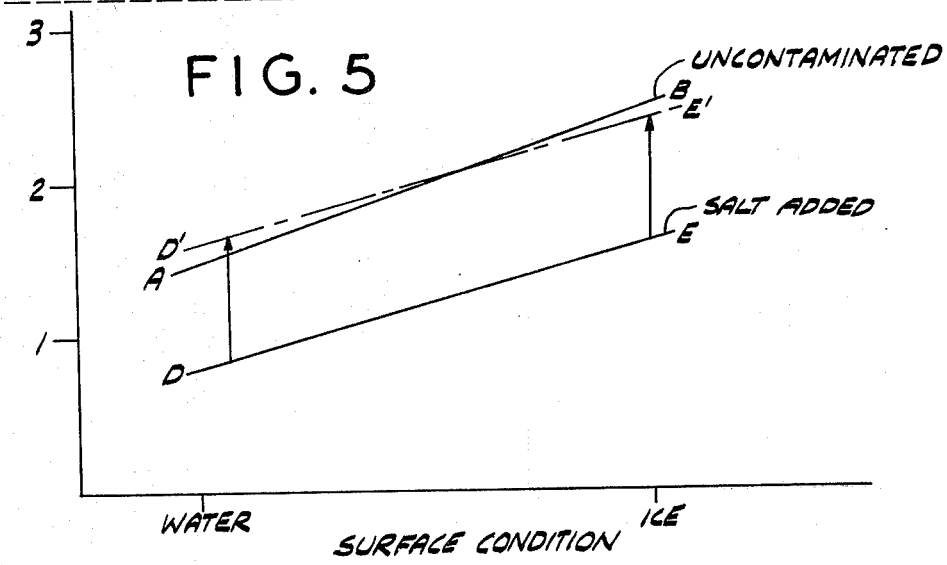
FIG. 5 is a graph illustrating how the presence of salt in surface precipitation affects the output of the sensor circuit in the system of FIG. 4.

The presence of ice control chemicals such as salt in precipitation on the sensor surface affects the conductance of the precipitation. Low concentrations of salt, in the range of 0.25 percent up to 5, percent will increase the conductance of the thus contaminated precipitation covering the electrodes 35,37 of conductivity sensor 39 considerably. The conductance of salt water as compared to salt ice is quite different. Referring to FIG. 5, as a comparison in the case of uncontaminated water and uncontaminated ice, the voltage output of sensor circuit 43 varies from an exemplary level of about 1.5 volts for water to a 2.5 volt representative level for ice (line AB), a delta increase of 1 volt. In the case of salt water-salt ice, a typical delta increase is in the order of 0.75 to 0.8 volts (line DE) although the output levels of sensor circuit 43 are considerably lower for salt water-salt ice than for water-ice.

The presence of ice control chemicals in the precipitation will also affect the output level of capacitance circuit 41. As previously indicated with only frost or water present, the capacitance circuit has typical output levels of 0.4 to 0.5 volts and 1 volt respectively. However, the output level of circuit 41 will increase to 1.2 volts where salt is present with ice and increase to 1.75 volts for salt water. Such was found to be true down to the lowest salt concentration tested (0.25 percent).

The reduced output signal level (line DE of FIG. 5) of sensor circuit 43 due to the presence of salt in the surface precipitation may be compensated with logic circuitry responsive to the marked increase of the output of capacitance circuit 41 when a salt is present in precipitation on the surface. This is accomplished by increasing the voltage applied accros conductivity sensor 39 and resistor R3 so that the relationship of the output level of circuit 43 to surface conditions is represented by line D'E' fo FIG. 5 which is substantially coincident with line AB.

To effect such a result, a salt compensating circuit including comparator 53 (see FIG. 4) is provided. One input of comparator 53 is connected to the output of amplifier 49, the other input to the wiper of a potentiometer P6 which is connected from +V. to ground. The output of comparator 43 is connected to the negative terminal of battery 51. Potentiometer P6 is adjusted to apply slightly less than the exemplary 1.2 volts to the top input of the comparator.

When the output signal level of capacitance circuit 41 exceeds the voltage applied by potentiometer P6 to the outer input of comparator 53, an output voltage is supplied which is additive to the voltage applied by battery 51, across conductivity sensor 39 and resistor R3. This additional voltage increment increases the magnitude of the output of sensor circuit 43 thereby automatically to compensate for the increased conductivity of conductivity sensor 39 caused by the presence of salt. Since potentiometer P6 applied a higher voltage is comparator 53 than the maximum output of the capacitance circuit under any "no salt" surface condition, comparator 53 can never function to supply any such compensating additional voltage increment when no salt is present in the surface precipitation.

Again, the surface detection system of FIG. 4 does not change or affect the nature or state of the precipitation being detected through melting and/or evaporation. Moreover, this system of FIG. 4 operates reliably even under unusual surface conditions such as when a thick layer of ice covers the surface, when a very thin layer of moisture forms under an ice layer as may occur with the use of ice control chemicals, or when a layer of water forms atop a layer of ice.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for detecting wet and icy conditions on the surface of highways, airport runways and the like comprising:
    a first capacitor adapted to be positioned on a surface the condition of which is to be detected, said capacitor having first and second spaced-apart electrodes adapted to be positioned substantially coplanar with said surface and exposed to atmospheric precipitation thereby to affect the dielectric and capacitance thereof;
    a second capacitor comprising first and second electrodes spaced from and substantially identical to and in registration with the aforesaid electrodes and adapted to be positioned so as not to be exposed to atmospheric precipitation;
    means for concurrently applying respective out-of-phase time-varying signals to the first electrodes of said capacitors, said second electrodes being commonly connected; and
    means for indicating when the magnitude of a signal coupled to the commonly connected second electrodes reaches a predetermined magnitude thereby to provide an indication of the presence of any atmospheric precipitation on said surface.

2. A system as set forth in claim 1 wherein the electrodes of said capacitors are covered by layers of electrical insulation.

3. A system as set forth in claim 2 wherein the electrodes of said second capacitor are covered by a layer of electrical insulation thicker than that of the layer covering the electrodes of said first capacitor.

4. A system as set foth in claim 2 wherein the electrodes of said first and those of said second capcitors are respectively interdigitated.

5. A system as set forth in claim 4 wherein the electrodes of said first capacitor are positioned on one surface of an insulative substrate and the electrodes of said second capacitor are positioned on the opposite surface of the substrate.

6. A system as set forth in claim 1 wherein said respective signals are substantially identical and 180° out-of-phase.

7. A system as set forth in claim 6 further comprising means for balancing the signals coupled to said second electrodes so that in the absence of any precipitation substantially no resultant signal is present at the second electrodes.

8. A system as set forth in claim 7 wherein the balancing means includes means for adjusting the magnitude of the signal applied to the first electrode of one of the capacitors.

9. A system as set forth in claim 1 wherein said respective time-varying signals are composites of a substantially constant amplitude lower frequency signal component and a substantially constant amplitude higher frequency signal component, and wherein said system further comprises a filter for separating the lower frequency signal component and the higher frequency signal component of any signal coupled to the commonly connected second electrodes.

10. A system as set forth in claim 9 in which the indicating means includes means responsive to the magnitude of any signal coupled to said second electrodes failing to reach said predetermined magnitude thereby to provide an indication of a clear surface condition.

11. A system as set forth in claim 10 in which the indicating means includes means responsive to the magnitudes of the responsive coupled signal components reaching said predetermined magnitude thereby to indicate a wet surface condition.

12. A system as set forth in claim 11 in which the indicating means includes means responsive to a change in the ratio of the magnitude of the coupled higher frequency signal component to the magnitude of the coupled lower frequency signal component thereby to indicate an icy surface condition.

13. A system as set forth in claim 9 wherein said respective time-varying signals applied to the first electrodes of said capacitors are substantially identical and 180° out-of-phase.

14. A system as set forth in claim 13 further comprising means for adjusting the magnitude of the signal applied to the first electrodes of one of the capacitors so that in the absence of any precipitation substantially no resultant signal is present on the second electrodes, and in which the indicating means includes means responsive to the substantial absence of any resultant signal being present at the commonly connected electrodes thereby to provide an indication of a clear surface condition.

15. A system as set forth in claim 14, which further includes means for adjusting the amplitudes of the lower frequency signal component and the higher frequency signal component to be equal.

16. A system as set forth in claim 15 in which the indicating means includes means responsive to higher and lower frequency signal components of substantially equal amplitudes in excess of said predetermined magnitude being coupled to the commonly connected electrodes thereby to indicate a wet surface condition.

17. A system as set forth in claim 16 in which the indicating means includes means responsive to a change in the ratio of magnitudes of said coupled higher and lower frequency signal components thereby to indicate an icy surface condition.

18. A systen as set forth in claim 9 wherein said lower frequency is in the order of 1000 Hz and said higher frequency is in the order of 200 KHz.

* * * * *

UNITED STATES PATENT OFFICE
CERTIFICATE OF CORRECTION

PATENT NO. : 3,882,381
DATED : May 6, 1975
INVENTOR(S) : Robert O. Gregory

It is certified that error appears in the above-identified patent and that said Letters Patent are hereby corrected as shown below:

Column 1, line 36, "systems" should read -- system --. Column 4, line 11, "constant" should read -- constants --; line 32, "decrease" should read -- decreases --. Column 5, line 64, "spacedapart" should read -- spaced-apart --. Column 6, line 61, "suruface" should read -- surface --. Column 7, line 40, "input to each" should read -- input of each --. Column 8, line 27, "5, percent" should read -- 5%, --. Column 9, line 6, "the outer input" should read -- the other input --; Line 13, "voltage is" should read -- voltage to --. Column 10, line 3, "set foth in" should read -- set forth in --; line 4, "capcitors" should read -- capacitors --; line 39, "responsive" should read -- respective --; line 54, "electrodes" should read -- electrode --. Column 12, line 3, "systen" should read -- system --.

Signed and Sealed this twenty-third Day of September 1975

[SEAL]

Attest:

RUTH C. MASON
Attesting Officer

C. MARSHALL DANN
Commissioner of Patents and Trademarks